L. E. EATON.
HANDLE FOR DENTAL IMPRESSION TRAYS, &c.
APPLICATION FILED FEB. 1, 1913.
1,073,893.
Patented Sept. 23, 1913.
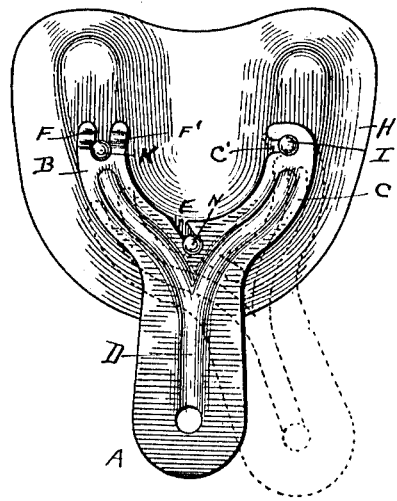
FIG. 1.
FIG. 2.
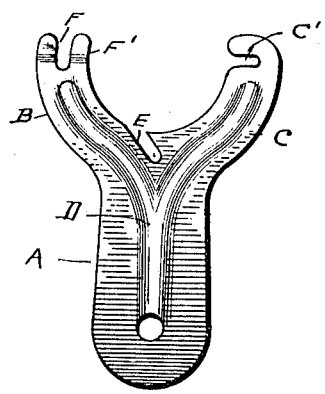
FIG. 3.
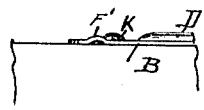
WITNESSES
INVENTOR
Leslie E. Eaton,
By Franklin N. Hough
Attorney
COLUMBIA PLANOGRAPH CO., WASHINGTON, D. C.

UNITED STATES PATENT OFFICE.

LESLIE EUGENE EATON, OF STURGIS, SOUTH DAKOTA.

HANDLE FOR DENTAL IMPRESSION-TRAYS, &c.

1,073,893.  Specification of Letters Patent.  Patented Sept. 23, 1913.

Application filed February 1, 1913. Serial No. 745,707.

*To all whom it may concern:*

Be it known that I, LESLIE E. EATON, a citizen of the United States, residing at Sturgis, in the county of Meade and State of South Dakota, have invented certain new and useful Improvements in Handles for Dental Impression-Trays, &c.; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in handles for dental impression trays and the object in view is to produce a simple and efficient device of this nature so arranged that the handles may be detachably held to the tray, affording a convenient means whereby the trays may nest together and be reduced to a compact shape for convenience in shipping, etc. The invention comprises various details of construction and combinations and arrangements of parts which will be hereinafter fully described, shown in the accompanying drawings and then specifically defined in the appended claim.

I illustrate my invention in the accompanying drawings, in which:—

Figure 1 is a bottom plan view of an impression tray showing my improved handle attached thereto. Fig. 2 is a detail view of the handle removed from the tray, and Fig. 3 is a side elevation showing the manner of holding the handle and tray together.

Reference now being had to the details of the drawings by letter, A designates a handle made of any suitable material which has curved arms B and C. Said handle is preferably reinforced by a longitudinal forked rib D, making the handle rigid and the arm C has a slot C' formed in the marginal edge thereof near its end and at the forking of the arm is a diagonally disposed slot E, while the arm B is provided with an inclined slot F. Said inclined slot has the marginal edges thereof raised as at F' in order to assist in holding the handle to the headed lugs of the impression tray H. Said tray has another headed lug I which is adapted to engage the slot C, while a third headed lug N is engaged by the diagonally disposed slot E.

In applying the handle to the tray, the lug I is engaged by the slot C' when the handle is in the position shown in dotted lines in Fig. 1 of the drawings. The handle is then swung laterally to the left and the lug N made to engage the diagonal slot E and a further swinging movement will cause the slot F to engage the headed lug K and, by pushing upon the handle slightly when the raised portions F' reach the head of the lug K, the arm B will spring slightly, allowing the raised portion to pass by the lug, after which the resiliency of the arm B will cause the lug to spring out in front of the headed lug K and serve as a means for holding the handle in a locked relation with the tray. When the handle is swung in the opposite direction, it may be readily detached as will be understood.

What I claim to be new is:—

A detachable handle for dental impression trays comprising a shank portion with arms, one of which is slotted in the marginal edge thereof and the other arm provided with an end slot and with an intermediate diagonally disposed slot, said slots adapted to engage the headed lugs of a dental tray, as set forth.

In testimony whereof I hereunto affix my signature in the presence of two witnesses.

LESLIE EUGENE EATON.

Witnesses:
EMMA HUFENDICK,
CHARLES MILEK.

Copies of this patent may be obtained for five cents each, by addressing the "Commissioner of Patents, Washington, D. C."